Patented Sept. 23, 1930

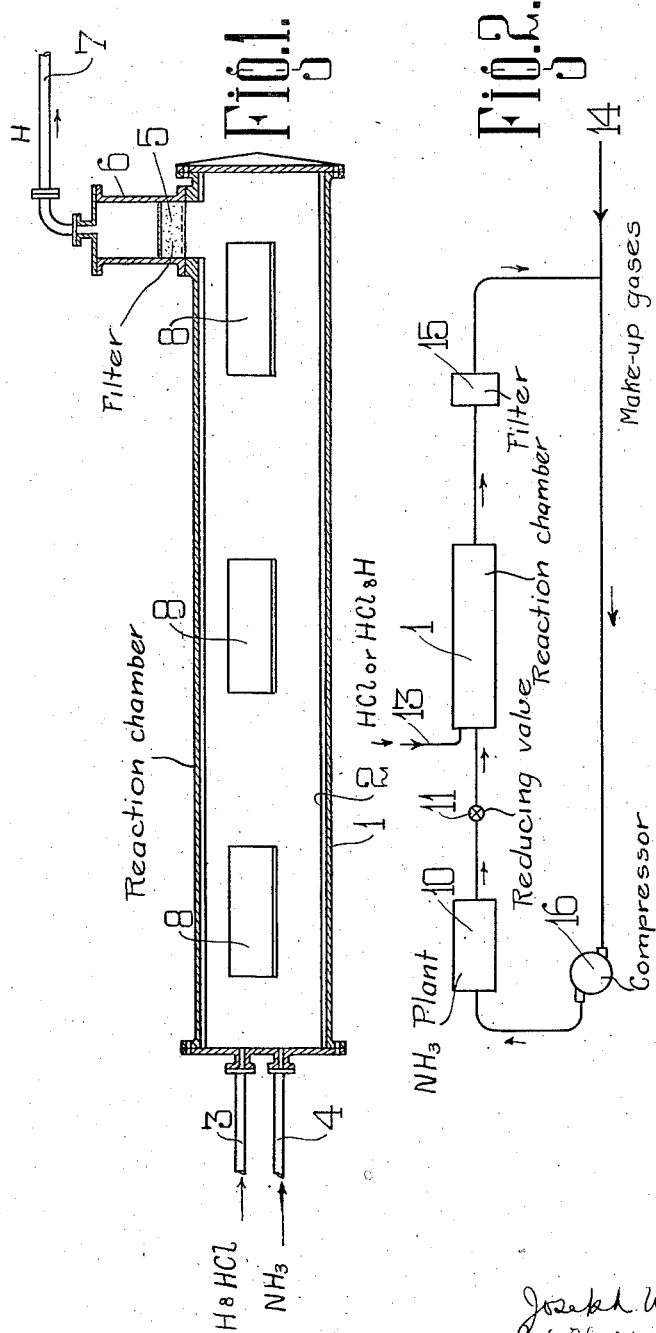

1,776,698

UNITED STATES PATENT OFFICE

JOSEPH WILLIAM MOORE, OF RUNCORN, AND WILFRID GUSTAV POLACK, OF FRODSHAM, ENGLAND, ASSIGNORS TO IMPERIAL CHEMICAL INDUSTRIES LIMITED, OF LONDON, ENGLAND, A BRITISH COMPANY

PROCESS OF MANUFACTURING AMMONIUM CHLORIDE

Application filed June 1, 1927, Serial No. 195,745, and in Great Britain June 25, 1926.

This invention relates to improved processes of manufacturing ammonium chloride.

The object of the invention is to provide an improved cyclic process. A further object is to produce ammonium chloride of high chemical purity by direct combination.

According to the invention, we effect an interaction between ammonia and hydrochloric acid in presence of hydrogen in such a manner as to precipitate ammonium chloride, after which the excess of hydrogen is employed for the synthesis of further quantities of the initial reagents, namely ammonia or hydrochloric acid, in such manner that the whole process can be made cyclic inasmuch as a repeated series of operations can be performed without substantial loss of hydrogen.

We prefer to use synthetic ammonia (obtained by direct synthesis from nitrogen and hydrogen in known manner) and we also prefer to use synthetic hydrochloric acid (obtained by direct combination of hydrogen with chlorine.)

In the accompanying drawings:—

Figure 1 is an illustration in vertical section of a suitable reaction-chamber.

Figure 2 is a diagrammatic flow sheet.

But, provided hydrogen is present during the reaction the process of the invention can be employed even if ammonia or hydrochloric acid is used which has been obtained in any other manner.

Example 1

We use a mixture of hydrogen and hydrochloric acid obtained by burning chlorine in excess of hydrogen, e. g. the mixture may contain 30% of free hydrogen. This mixture is introduced through pipe 3 (Fig. 1) into a tubular or other reaction chamber 1 which may be lined with tiles 2 and the ammonia is introduced through pipe 4. Before reaching the reaction-chamber the ammonia and gaseous mixture of hydrogen and hydrochloric acid may be rendered substantially anhydrous preferably by low temperature cooling or by other means. The reaction chamber is provided with doors or apertures 8 through which the precipitated ammonium chloride can be removed. An outstanding feature of the ammonium chloride as produced is its extraordinary purity and suitability for use without further refining where a pure substance is required.

The hydrogen leaves the tube at the other end and is sent through a filter 5 to remove any suspended ammonium chloride after which it is passed through pipes 6 and 7 to the synthetic ammonia plant or to the synthetic hydrochloric acid plant.

When the residual hydrogen is employed for ammonia synthesis, it is desirable to use a slight excess of ammonia over hydrochloric acid when admitting the gases into the tube and conversely when the residual hydrogen is to be used for hydrochloric acid synthesis, it is desirable to employ a slight excess of hydrochloric acid. The small excess of either gas may be removed by subsequent absorption if desired and in this way foreign substances are eliminated from the synthesis plant as far as required.

Example 2

The gases from a synthetic ammonia plant containing hydrogen, nitrogen and ammonia are caused to react with pure hydrochloric acid gas (which may or may not contain free hydrogen). The reaction may take place under high pressure or not. The ammonium chloride is obtained in the form of a solid or of a strong solution. The residual hydrogen and nitrogen are again employed for ammonia synthesis if necessary after suitably adjusting the ratio of hydrogen to nitrogen by the addition of nitrogen or hydrogen as required. In this modification of our invention, the ammonia can be removed from the gases as ammonium chloride without liquefaction or scrubbing with water.

In Fig. 2, 10 is the synthetic ammonia plant, 11 a reducing valve, 1 the reaction vessel, 15 the filter and 16 the compressor. Hydrochloric acid is added at 13 and make-up gases at 14.

We declare that what we claim is:—

1. The cyclic process of manufacturing ammonium chloride which consists in combining gaseous ammonia as one reagent with gaseous hydrochloric acid as another reagent in presence of hydrogen, removing ammonium chloride and synthesizing one of said reagents by the use of the residual hydrogen.

2. The process of manufacturing ammonium chloride which consists in combining gaseous synthetic ammonia with gaseous synthetic hydrochloric acid in presence of hydrogen, removing ammonium chloride in solid form, and utilizing the hydrogen for synthesis of one of the initial reagents used in the process.

3. The process of manufacturing ammonium chloride which consists in mixing the gases from an ammonia synthesis plant with hydrochloric acid, removing the ammonium chloride so formed and passing the residual gases to the synthesis plant.

In witness whereof, we have hereunto signed our names this 19th day of May, 1927.

JOSEPH WILLIAM MOORE.
WILFRID GUSTAV POLACK.